UNITED STATES PATENT OFFICE.

GEO. F. HASSENPFLUG AND GEORGE BARNHART, OF GREEN TOWNSHIP, ROSS COUNTY, OHIO.

IMPROVED CULTIVATOR.

Specification forming part of Letters Patent No. 47,105, dated April 4, 1865.

*To all whom it may concern:*

Be it known that we, GEORGE F. HASSENPFLUG and GEORGE BARNHART, of the township of Green, in the county of Ross and State of Ohio, have invented a new and useful Improvement of the Cultivators now in use; and we do hereby declare that the following is a full, clear, and exact description of the construction and operation of the same, reference being had to the annexed drawings, in which—

Figure 1 is a perspective view; Fig. 2, detached sectional view.

$a$ is a semicircular rim; $b$, upright legs to which shovels are attached; $c$, cross-bar on which two of the upright legs are attached by hinges marked $d$; $e$, pivots by which upright legs are fastened to semicircular rim near the ends; $f$, holes through which the pivots are inserted; $g$, stay-rods passing from the semicircular rim to the upright legs; $h$, supports by which the handles are elevated or depressed; $i$, draft-pole, which is constructed and arranged as follows, to wit: a rim of wood steamed and bent in a semicircular shape, and plated on the out or exposed side with strap or band iron. Upright legs are attached either to the inside or outside of this semicircular rim by a pivot or bolt passing through the holes or eyelets marked $f$; and two are attached to the cross-bar by hinges, which two can be widened or narrowed at pleasure by unscrewing the nuts and passing the bolts or screws by which the hinges are fastened through eyelets in said cross-bar made for this purpose, and which are marked $k$. These upright legs are held firmly in their position by the stay-rods attached to the inner side of the semicircular rim, passing through these upright legs a little above the shovels, and after passing through them a wooden pin retains them, as will be seen in the detached section at $m$. The object of this arrangement of the parts is to permit the upright legs, if striking some obstruction beneath the surface that is sufficiently firm, to break the wooden pin and fly back on its hinge until the stump or other obstruction is passed over.

The two interior upright legs can be taken off, if desired, and the outer ones attached by pivot adjustable at $n$, so that it can be worked in corn of considerable height without bending or breaking the corn, and if so adjusted, then the handles of the cultivator can be lowered so as to bring it to the proper height by unscrewing the nut and passing the bolt through the eyelet marked $o$ and the support attached to the handles nearer the semicircular rim.

The nature of this improvement consists in constructing it with this semicircular rim, so as to give it lightness, strength, durability, and simplicity, and thus rendering the whole machine not so cumbrous, heavy, and complicated as those now in use, for the weight, when ready for work, of the whole machine will not exceed sixty-five (65) pounds, and on this account can be used in hilly or sideling ground as readily as on level or cleared land.

HASSENPFLUG & BARNHART.
Cultivator.
No 47,105
Patented Apr 4. 1865.
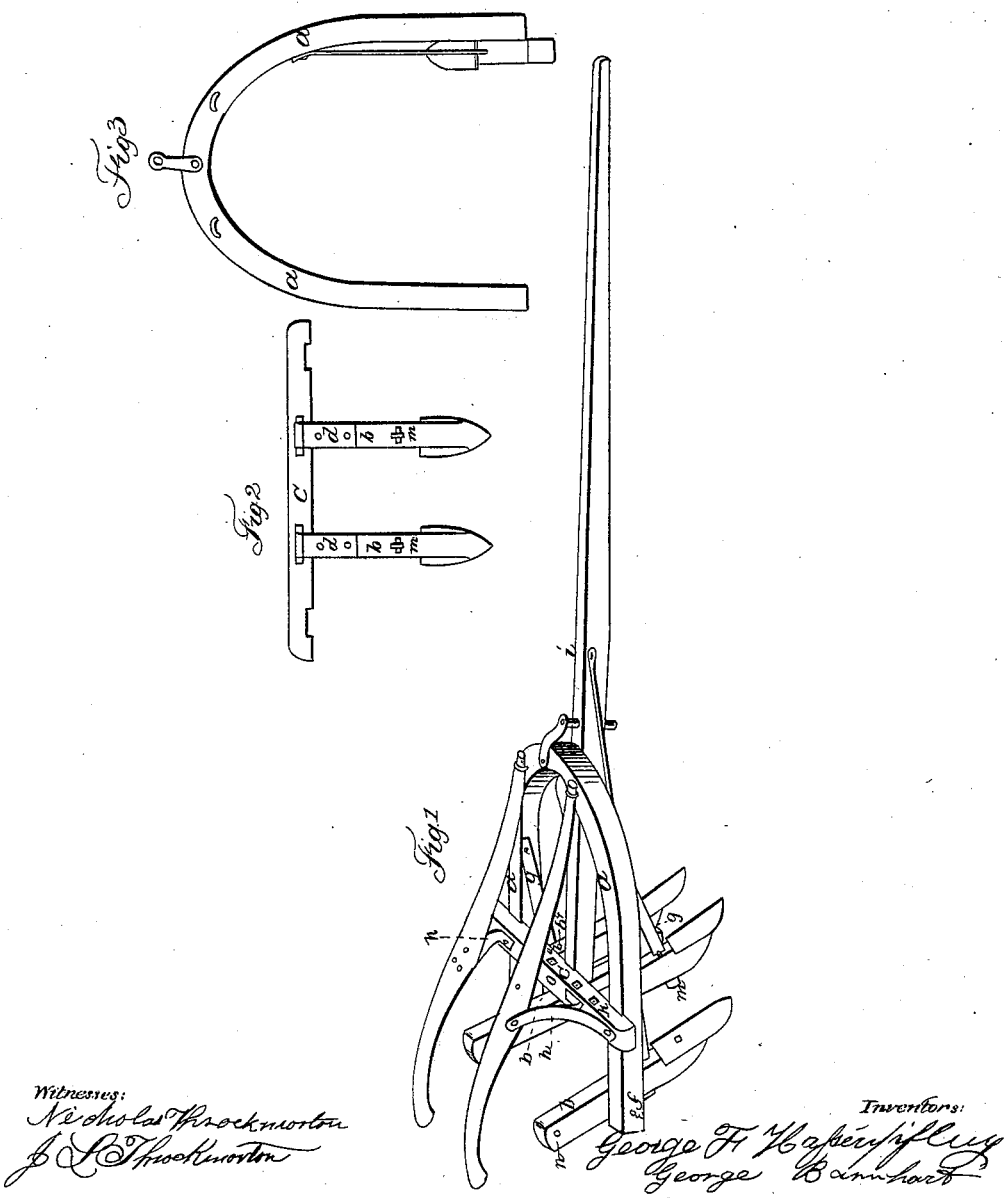

We claim—

The frame $a c$, when constructed as described, in combination with the plow-standards $b b b b$, the same being attached to the frame as specified.

Chillicothe, November 18, 1864.

GEORGE F. HASSENPFLUG.
GEORGE BARNHART.

In presence of—
NICHOLAS THROCKMORTON,
J. L. THROCKMORTON.